Oct. 23, 1956     R. COVER     2,767,716
CORN CUTTING MACHINE
Filed April 2, 1953     6 Sheets-Sheet 2

INVENTOR
RALPH COVER

Oct. 23, 1956

R. COVER 2,767,716

CORN CUTTING MACHINE

Filed April 2, 1953

INVENTOR
RALPH COVER

BY Mason, Porter, Diller & Stewart
ATTORNEYS

Oct. 23, 1956    R. COVER    2,767,716
CORN CUTTING MACHINE
Filed April 2, 1953    6 Sheets-Sheet 4

INVENTOR
RALPH COVER
BY
Mason, Porter, Diller & Stewart
ATTORNEYS

Oct. 23, 1956

R. COVER 2,767,716

CORN CUTTING MACHINE

Filed April 2, 1953

INVENTOR
RALPH COVER

BY Mason, Porter, Diller & Stewart
ATTORNEYS

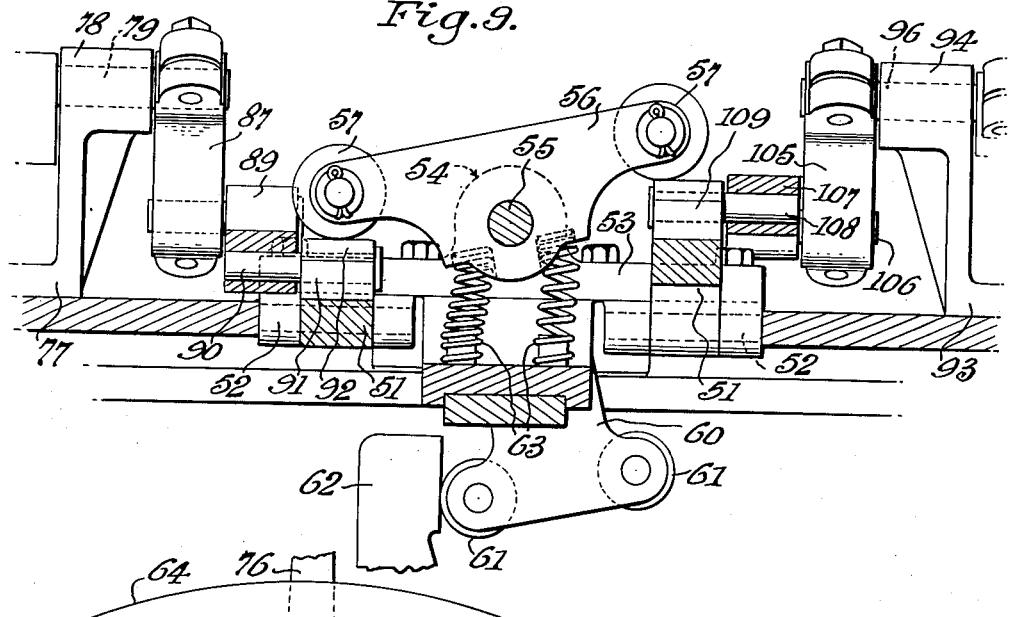
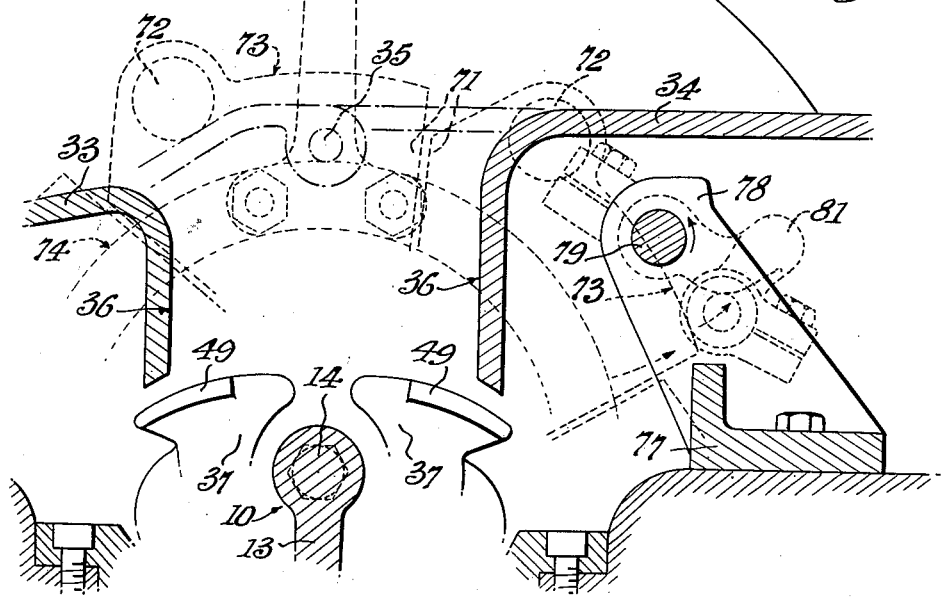

United States Patent Office 2,767,716
Patented Oct. 23, 1956

2,767,716

CORN CUTTING MACHINE

Ralph Cover, Westminster, Md.

Application April 2, 1953, Serial No. 346,334

16 Claims. (Cl. 130—9)

The invention relates generally to corn cutting machines in which the kernels are cut from the corn cobs, and it primarily seeks to provide novel means for preventing the feeding of another ear of corn into a cutter head wherein a previously fed ear is jammed, thereby to assure against the occurrence of double chokes.

Corn cutting machinery is well known, and one very popular and efficient machine of this character is disclosed in the U. S. Letters Patent 2,332,894 issued to Ralph Cover on October 26, 1943. In this form of machine there is included an elongated top frame structure or bed having a cutter head disposed uprightly across each end thereof, corn ear feeding or receiving and centering means in advance of each said head, and a double ended pusher reciprocable along the bed for alternately pushing corn ears from said receivers into and through the respective cutter heads. The cutter head and mounting structures embodied in the particular type of corn cutting machine referred to are covered in the U. S. Letters Patents 2,216,065 and 2,510,558 issued to Ralph Cover on September 24, 1940 and June 6, 1950, respectively, but it is contemplated that the improvements of the present invention may be embodied in combination in other specific machine and head structures. Such cutter heads include cutter blades which are arranged in a generally circular relation for effectively cutting the kernels from the corn cobs, and gages contacted by the corn ears as they are being forced through the cutter head by the plunger for positioning the blades so as to make the proper depth of cut. The blades and gages are mounted on swingable carriers which are movable radially outwardly as the gages and blades are contacted by the corn ears, and spring means serve to yieldably maintain the contact with the corn ear during cutting, and to return the carriers to their normal position after the cutting of kernels from each ear is completed. In order to obtain desirably efficient, high quality cutting of the corn it is important that the cutting mechanism be adjusted sensitively, or in other words, that the spring action effective to retract the cutting blades and gages and hold them against the corn ears be lightly applied. Because of this fact, operators who do not properly service their cutters and keep them clean and properly lubricated have encountered difficulties in the way of gumming up and sticking of the parts in the partially open or blade expanded position. This gumming and sticking problem is aggravated when old starchy corn is being processed, and the effect is to bring about faulty cutting of the corn and choking of the cutter heads. Choking also is caused by the feeding of malformed or partly broken corn ears which feed off line and jam into the cutting blades. Corn ears having pithy, undeveloped soft tips or which are only partially husked also are likely to engage improperly in and foul the blades. Some operators have found that by increasing the spring action tending to retract the blades the problems resulting from sluggish action and the likelihood of choking can be reduced somewhat, but any attempt to solve the problems referred to by spring tightening is but partial solution at best, and is necessarily attended by a sacrificing of the desired high quality cutting. Therefore, it is a purpose of the present invention to provide a novel corn ear placement or feed control means effective upon any retention of the blade carriers outwardly of their fully retracted position, either because of mere sluggish action or gumming of the head parts, or by reason of the choking of the same by a jammed corn ear, to prevent the feeding or placement of a corn ear in position for being pushed into the cutter head by the next advance movement of the reciprocable pusher.

In corn cutting machines of the type referred to the corn ear feeding or receiving and centering means disposed in advance of a cutter head and from which the pusher advances the corn ear into the cutter head includes a pair of jaws which are separated each time the pusher is retracted and which are brought together to accurately hold the corn ear in position in advance of the pusher as it moves toward the cutter head. Cover means also is provided above the receiving and centering devices and includes an opening through which corn ears may be dropped into receiving position. The receiver or feed jaws have top wing portions so placed that they form a closure at the bottom of the cover opening when the jaws are closed, and therefore an ear of corn placed in the cover opening cannot fall down into position between the jaws for being engaged by the reciprocable pusher and pushed into the cutter head until said jaws have been separated to receive the same. Therefore, it is an object of the present invention to provide novel means operable under control of the blade carriers whenever they are held outwardly of their fully retracted position at a time when the corn ear advancing pusher is retracted preparatory to its advance toward the cutter head to prevent opening of the receiving jaws and the falling between them of a corn ear from the ear receiving cover opening.

An object of the present invention is to provide a machine structure of the character stated wherein there are included an actuator, means for imparting movement to the actuator upon each retraction of the corn ear pusher from the cutter head, means contacted by said actuator during said movement for imparting movement to the cover opening closure means for allowing a corn ear placed in said opening to fall into the feeding or receiving and centering means, said last named movement imparting means including a displaceable interponent, and means controlled by movement of the blade carriers for displacing the interponent to allow the actuator to move idly whenever the cutter blades are held outwardly of their fully retracted position when the pusher is retracted, without transmission of movement to the closure means.

Another object of the present invention is to provide a machine structure of the character stated wherein there are included an actuator, means for imparting movement to the actuator upon each retraction of the corn ear pusher from the cutter head, means contacted by said actuator during said movement for imparting movement of separation to the corn ear receiving jaws to condition them for receiving an ear of corn, said last named movement imparting means including a displaceable interponent, and means controlled by movement of the blade carriers for displacing the interponent to allow the actuator to move idly whenever the cutter blades are held outwardly of their fully retracted position when the pusher is retracted, without transmission of movement to the corn ear receiving jaws.

Another object of the invention is to provide an interponent placing and displacing means of the character stated including a rock shaft, a crank on the rock shaft engageable by a blade carrier, spring means constantly urging the crank toward the blade carrier, and an interponent carrier member movable with the rock shaft to effectively place the interponent, or to displace the interponent from its effective position, accordingly as the shaft is rocked in one direction or the other.

Another object of the invention is to provide an apparatus of the character stated in which the interponent includes a camming face on the surface thereof presented in position for being engaged by the actuator when the cutter blade carrier is held outwardly only a very limited distance from its fully retracted postion and which is effective when engaged by the actuator to enable the latter to displace the interponent against the action of the spring means.

Another object of the invention is to provide in a machine of the character stated including a cutter head at each end thereof, a set of interponent position controlling means at each end of the machine and engaging a blade carrier in the respective cutter head, and a common actuator engageable with the interponents of both sets of control means.

Another object of the invention is to provide in a machine of the character stated, a cutter head housing into which the blade carrier engaging crank of the interponent positioning control means is extended, means hingedly mounting the cutter head on said housing, and means limiting inward movement of said crank so that the head can be swung out of and back into effective corn cutting position without disrupting the effective positioning of the crank.

With the above and other objects in view that will hereinafter appear, the nature of the invention will be more clearly understood by reference to the following detailed description, the appended claims and the several views illustrated in the accompanying drawings.

In the drawings:

Figure 8 is a view similar to Figure 7 illustrating the cooperative relation of the control crank with the gage or guide means and blade carriers at the opposite end of the machine.

Figure 9 is an enlarged fragmentary vertical longitudinal section taken on the line 9—9 on Figure 4.

Figure 10 is a fragmentary vertical cross section taken on the line 10—10 on Figure 1.

Figure 11 is an enlarged fragmentary plan view illustrating the relation of the cross head actuator with one of the displaceable movement imparting interponents.

Figure 12 is a fragmentary somewhat diagrammatic inside face view of one of the swingably mounted cutter head carrier plates, the position of contact of the control crank roller with gage and blade carriers at opposite ends of the machine being diagrammatically illustrated in dotted lines.

Figure 1:
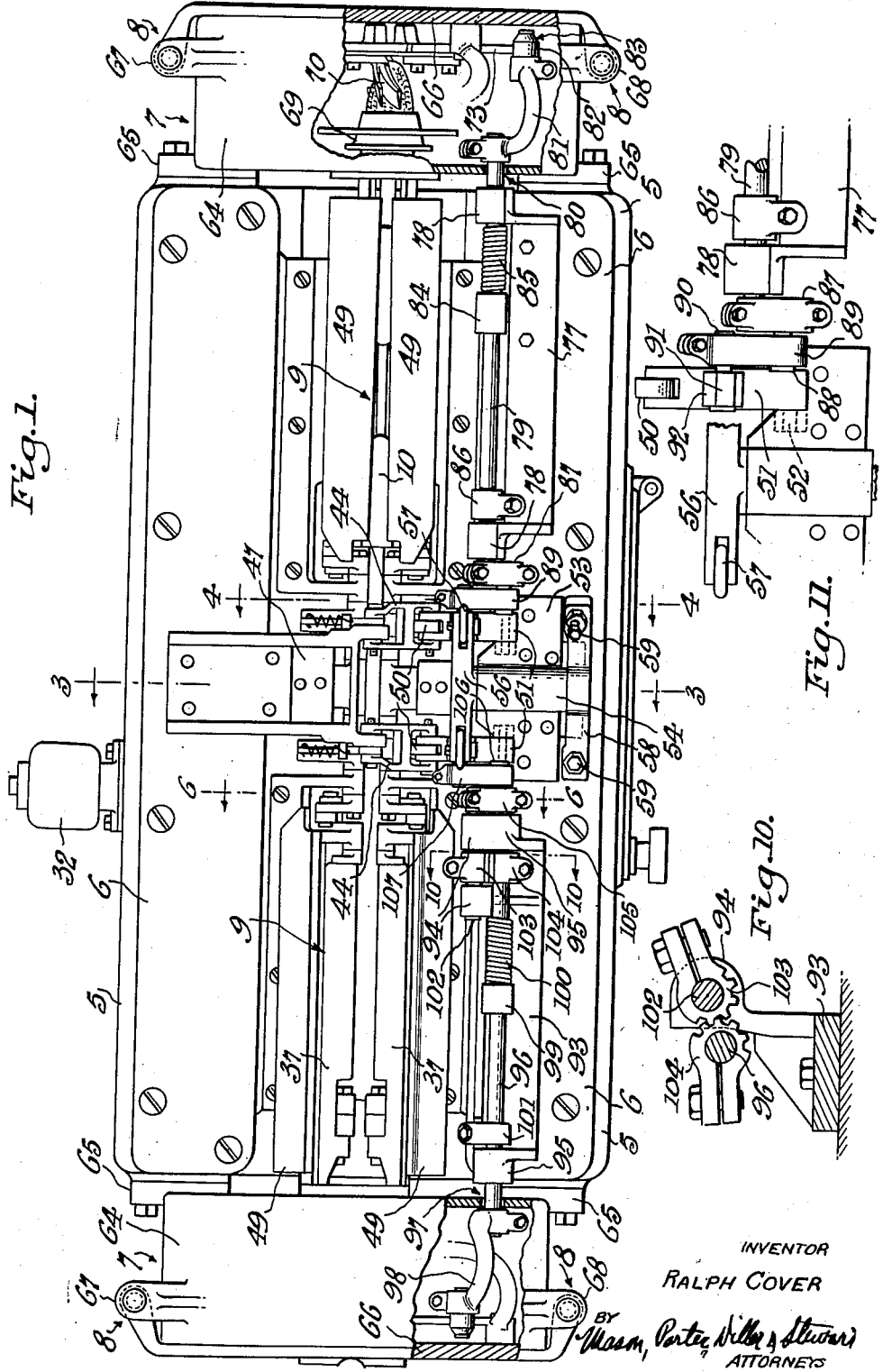
Figure 1 is a plan view of a corn cutting machine structure embodying the invention, the cover plates being removed in order to more clearly illustrate the underlying mechanism, and parts being broken away and in section.

In the practical development of the invention, the presently known corn cutting machine structures hereinbefore referred to are employed in novel combination with corn ear placement controlling means to be described in detail hereinafter. These machine structures include a machine frame or housing 5, closed in part at the top by the top or bed plates 6. A cutter head generally designated 7 is disposed uprightly across the center line of the machine at each end thereof, and each cutter head is swingably mounted as at 8 so that it can be selectively swung away to one side or the other to render the corn cutting devices accessible for servicing operations. A corn ear receiving or feeding means generally designated 9 is disposed centrally in advance of each cutter head at each end of the machine, and a single longitudinally reciprocable horizontally disposed double ended pusher or corn ear advancing means generally designated 10 serves to alternately push corn ears received and accurately placed in the receiving or feeding means 9 into and through the respective cutter heads. See Figures 1 and 2.

The pusher 10 comprises a horizontally reciprocable cross head 11 which is slidable on parallel, housing supported rods 12 and has a central upstanding support 13 in which is mounted the double ended pusher plunger means 14. See Figures 1, 3 and 4.

A longitudinal rack 15 is secured to the cross head 11 and is engaged with a large spur gear 16 mounted on the upper end of a shaft 17 which is rotatable in bearings provided therefor in a lower cross head 18. The cross head 18 is slidable on parallel, housing supported rods 19, and the shaft 17 has a small pinion 20 fixed thereon in position to mesh with and be rotated by the longitudinal rack 21 which is stationarily supported as at 22 on the housing. Because of the size of the gears 16 and 20, it will be apparent that the upper cross head will be moved at a greater rate and through a greater distance than the lower cross head.

The lower cross head 18 has a transverse slot 23 therein wherein a reciprocating roller 24 engages, the roller being mounted on the free end of a crank arm 25 attached to a vertical shaft 26 which is rotatable in bearings 27 provided therefor in the housing 28. A worm gear 29 is fixed on the shaft 26 within the housing 28 and has rotation imparted thereto through the medium of a meshing worm 30 mounted on a transverse shaft 31 driven by the frame housing supported motor 32.

Figure 7:
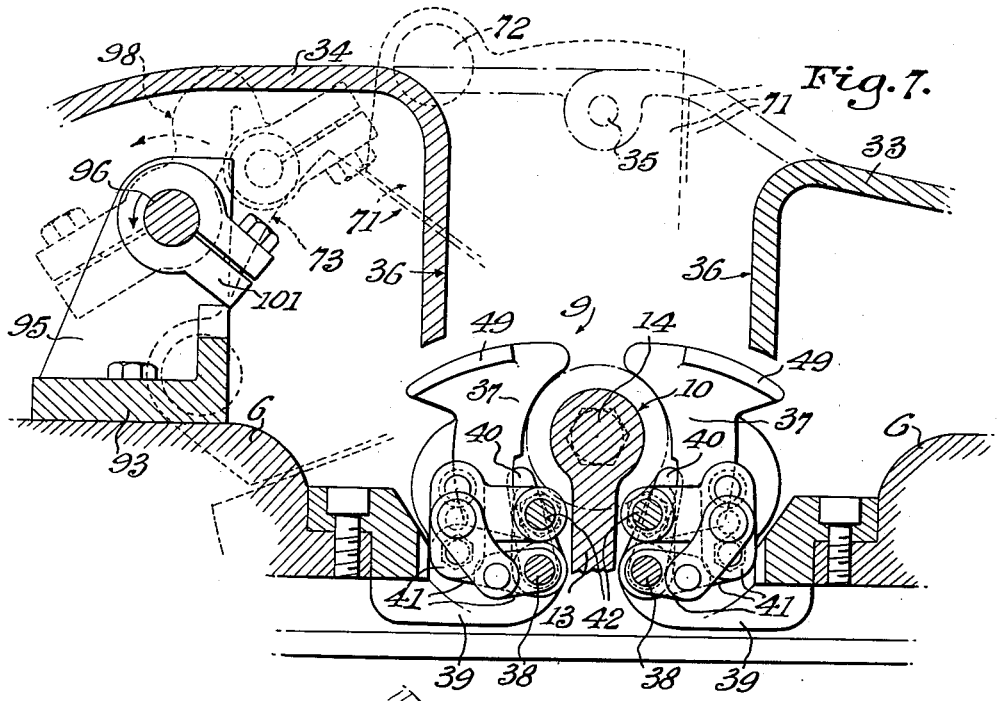
Figure 7 is a view similar to Figure 6, the feeding jaws being shown in the closed, corn ear placing position, and the association of the control crank with the gage or guide means and blade carriers at the particular end of the machine being illustrated in dotted lines.
Figure 6:
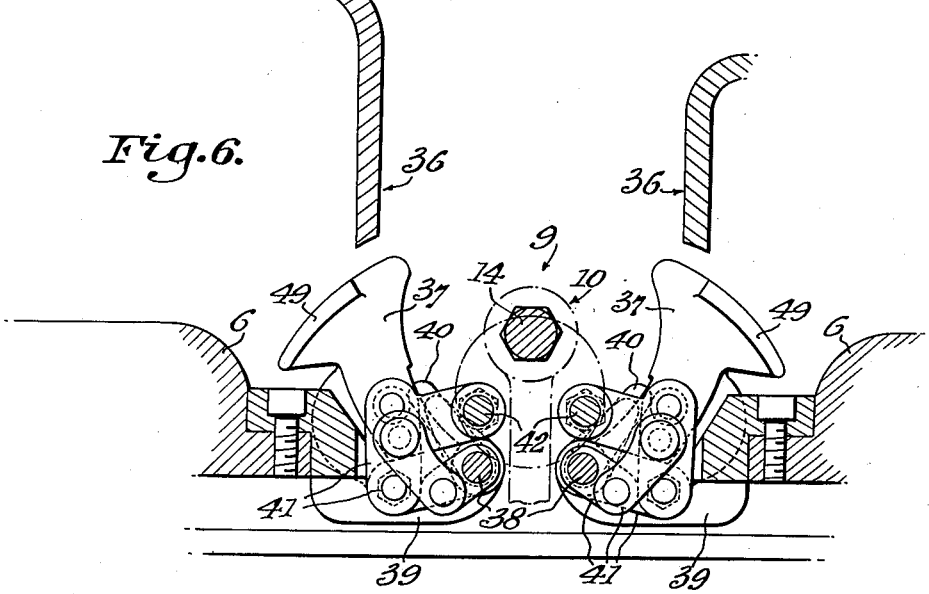
Figure 6 is a fragmentary vertical cross section taken on the line 6—6 on Figure 1 and showing one of the corn ear feeding or receiving jaw sets in the open or separated, corn ear receiving position.

A top cover plate 33 is mounted over the bed plate 6 along one side of the machine, and a top cover plate 34 is hingedly connected as at 35 to the plate 33 and extends along the other side of the machine. The plates 33 and 34 have recesses 36 in the inner edge portions thereof which cooperate in providing corn ear receiving drops registered over the respective corn ear receiving or feeding means generally designated 9 as shown in Figures 6 and 7 and through which corn ears may be received on top of the receiving means when positioned as shown in Figure 7, to fall into said receiving or feeding means when opened in the manner illustrated in Figure 6.

Each corn ear receiving means generally designated 9 comprises a pair of opposed jaws 37 which are swingable about fixed pivots 38 supported on brackets 39 attached to the bed plates 6. Each set of jaws forms a corn ear receiving and centering or feeding means in conjunction with an opposed pair of lifter wings 40 which are also swingable about the fixed pivots 38. The wings 40 also serve as guide means accurately guiding the corn ears toward the cutter means. Suitable movement imparting linkage generally designated 41 and connecting the jaws and wings for differential but cooperative movement are provided, and these are fully described in the previously mentioned U. S. Letters Patents and need not be dwelt upon in detail herein. It will suffice to say that these parts have driving connection with the rock shafts 42 which also are rockably supported in the brackets 39 and have fixed thereon actuator arm sets 43 best shown in Figures 3, 4 and 5. The arms 43 of each set have their laterally projected or free ends pivotally connected with link members 44 which are directed upwardly and inwardly and are pivotally connected together as at 45 by pin means engaged in a vertical guide slot 46 provided in the fixedly mounted bracket 47. See also Figure 1. Anchored spring means 48 serves constantly to tend to pull the arms 43 upwardly, or in other words to swing the jaws 37 and wings 40 of the receiving means toward each other or into the corn ear gripping and centering or feeding position in which a corn ear will be centered along the axis of the reciprocating plunger means 14 in the manner illustrated in Figure 7. It will be apparent by reference to Figure 7 that the jaws 37 of each corn receiving or feeding means set are equipped with top wings 49 which are generally horizontally disposed and serve as closure means upon which a corn ear deposited in the cover plate receiving openings 36 will rest while the jaws are in closed position as illustrated in Figure 7, to fall into position between the jaws when the same are moved apart or opened in the manner illustrated in Figure 6.

In order to effect an opening of each set of corn ear receiving or feeding jaws as the respective pusher end is retracted preparatory to a projection thereof for advancing and forcing a corn ear into and through the respective cutter head, one of each set of the generally horizontally disposed actuator arms 43 is engaged by a roller 50 mounted on the free end of an actuator arm 51 also generally horizontally disposed and pivoted at its outer end as at 52 on a bearing bracket 53 secured on one of the bed plates 6. See Figures 3, 4 and 5. It will be apparent by reference to Figure 1 that the actuator arms 51 are arranged in parallel relation. The bracket 53 has a transverse bearing 54 thereon in which a rock shaft 55 is rockably mounted. A cross head 56 is secured on the inner end of the rock shaft and extends longitudinally of the machine bed. It will be apparent by reference to Figure 1, 2 and 9 of the drawings that the cross head is equipped with an actuator roller 57 at each end thereof and overlying one of the actuator arms 51. At its other or outer end the rock shaft 55 carries a cross head 58 having an adjustable stop screw at 59 at each end thereof engageable with the underlying bed plate so as to limit downward rocking movement of the cross head. It is to be understood that when the cross head 56 is rocked to depress one of the rollers 57 at one end thereof, the stop screws 59 are so placed that downward movement of the roller will be limited to a position spaced above the top surface of the underlying actuator arm 51. See Figure 5. The reason for this relation of the parts will become apparent as this description progresses.

Figure 2:
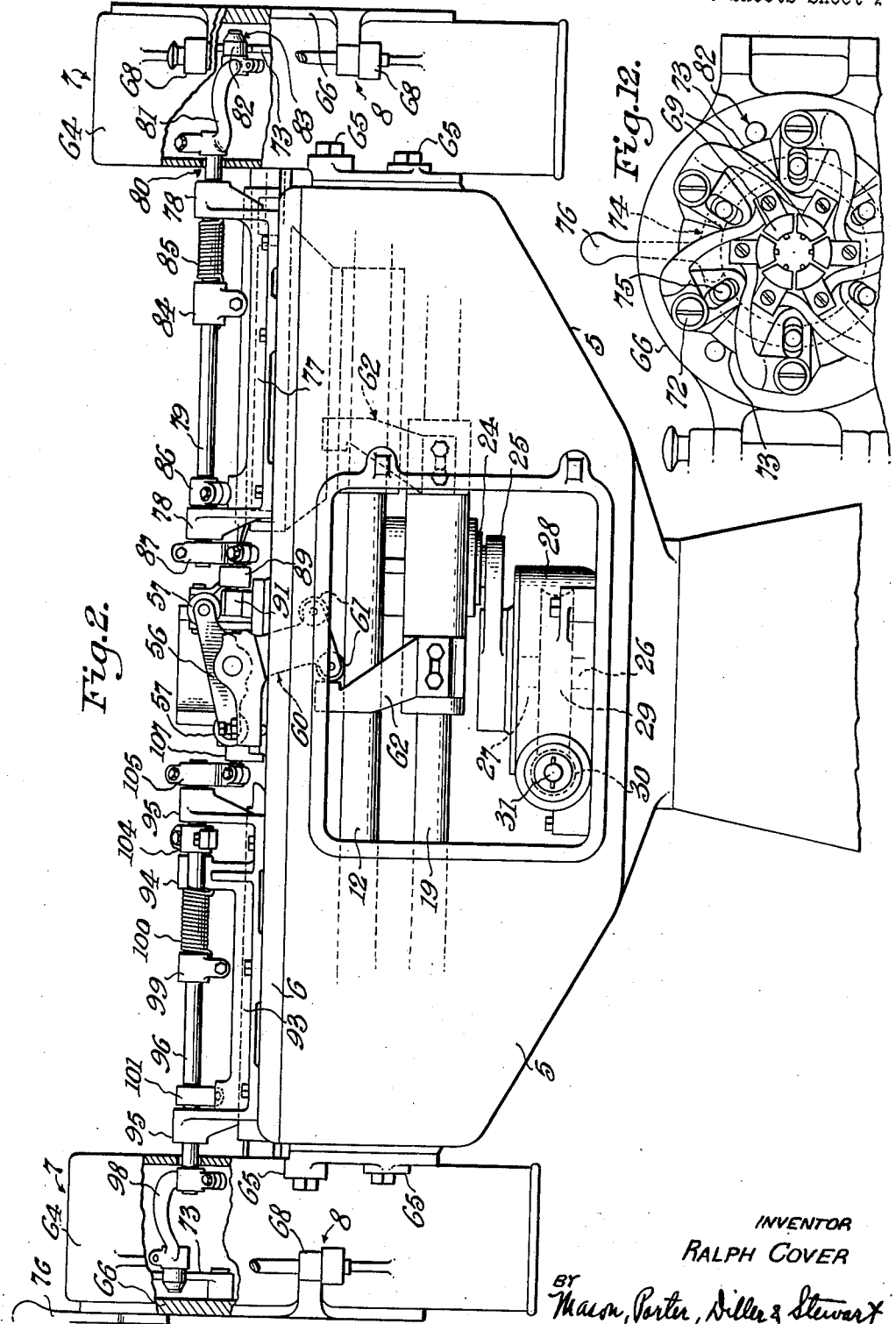
Figure 2 is a side elevation of the machine structure illustrated in Figure 1, the front cover plate of the frame or housing being removed, and parts being broken away and in section.

The stop cross head 58 has a depending actuator crank portion 60 having rollers 61 placed at the endwise directed portions thereof in the manner illustrated in Figures 2 and 9, and spring means 63 may be employed to constantly tend to center the cross heads 56 and 58 in a horizontal position.

Each cutter head generally designated 7 includes a housing portion 64 rigidly secured as at 65 to the frame housing 5, and a closure portion 66 on which the cutter head proper is supported and which is swingably mounted as generally designated at 8, or more specifically on the selective hinge pintle means 67 and 68 which permits selective swinging to one side or the other in the manner fully described in the previously mentioned U. S. Letters Patent covering the cutter head mounting. In each cutter head the gages and guiding devices 69 and blades 70 are mounted on carriers 71 which are swingably supported at 72 on the respective cover plate and which present outer edge portions 73 disposed in a generally circular arrangement so that when the blades are fully contracted the outer edge portions of the carriers will lie in a circular arrangement as shown in Figures 7, 8 and 12. It will be apparent by reference to Figures 1, 6 and 7 that the gages and the wings 40 also serve as guide means directing the course of the corn ears on the way to the cutter means 70. When the blades are expanded or moved outwardly during the cutting of the kernels from the corn ears said cutter carrier edges will lie in a larger circular arrangement, and this outward and inward movement of the outer edge portions 73 of the carriers is utilized to determine the placements of the control devices to be referred to hereinafter. The cutter head of the patents referred to herein and somewhat diagrammatically illustrated in Figures 1, 2, 7, 8 and 13 includes a tensioning ring 74 which is slot and pin connected to the carriers 71 as at 75, the ring being spring held in position for retracting the plates or holding them in their normal position assumed when no corn ear is being forced through the cutter head. The ring may be moved by manipulation of the connected handle 76.

All of the parts described hereinabove with the exception of the cross head 58 are old in the machine head structure and head mounting patents referred to herein, and the present invention resides in combining with these or equivalent part arrangements, novel control devices to be described hereinafter.

Along one end of the bed plate 6 on which the bearing bracket 53 is mounted is fixed a bearing bracket 77 having two horizontal bearings 78 in which a rock shaft 79 is supported. The rockably mounted shaft 79 extends at one end beyond the adjacent bearing 78 and through an aperture 80 into the interior of the adjacent cutter head housing portion 64 where it has a control crank 81 fixed thereon. See Figures 1, 2 and 8. The crank 81 is fixed on the rock shaft 79 through the medium of an adjustable clamp and is equipped with a roller 82 on its free end disposed to engage the outer edge portion of one of the gage and blade carriers 71. It is preferred that the roller be equipped with a bevelled end portion 83 in order to facilitate the return to cooperative relation of the roller and the carrier edge portion when the cutter head is swung away on its mounting in one direction or the other, and then returned to operative position. Attention is directed to Figures 1, 2, 4, 5, 9 and 11 from which it will be apparent that the rock shaft 79 also has a clamp 84 secured thereon, and a torsion spring 85 coiled about the shaft and having one end thereof anchored to the clamp 84 and its other end anchored to the adjacent bearing 78 serves constantly to tend to hold the crank 81 and its roller 82 against the cooperating outwardly movable carrier edge portion 73. Another clamp 86 is adjustably secured on the shaft 79 and is engageable with the bracket 77 to limit inward swinging movement of the crank 81 at times when the cutter head cover portion 66 may have been swung to the ineffective or servicing position.

Where it extends at its other end beyond the other bearing 78, the shaft 79 has a crank 87 secured thereon, and this crank has a pin 88 projecting longitudinally from its free end, or in the direction parallel the rock shaft 79, and on this pin the outer end of a placer link 89 is pivoted. The link 89 has its inner end pivot pin connected as at 90 with an interponent block 91 slidably supported on the underlying actuator arm 51 in the manner clearly illustrated in Figures 3, 4, 5 and 9 of the drawings. It will be noted that the interponent block 91 has its inner and upwardly directed corner portion bevelled as at 92 for a purpose to be described hereinafter. It will be readily apparent by reference to Figures 4 and 5 that whenever the interponent block 91 is in its normal position over the respective actuator arm 51 and under or in the path of movement of the overlying actuator roller 57, each time the roller is moved downwardly, it will engage the interponent block and cause the same to press downwardly on the underlying actuator arm 51 which will in turn depress the arm 43 and bring about an opening of the corn ear receiving jaws to the receiving position shown in Figure 6. This normal operation of the parts occurs upon each retraction of the pusher or plunger means 14 after it has been advanced to push a corn ear to and through the associated cutter head.

Attention is now directed to Figures 1, 2, 3, 7, 9 and 10 which clearly illustrate the control devices placed at the other end of the machine. Along the other end of the bed plate 6 on which the bearing bracket 53 is mounted there is fixed a bearing bracket 93 having two inner horizontal bearings 94 which are lined with the previously mentioned bearings 78, and two outer horizontal bearings 95. In the outer bearings 95 a shaft 96 is rockably mounted, and said shaft projects at one end beyond the bearing adjacent the other cutter head housing portion 64 and into the interior of said housing through an aperture 97. Within the housing the shaft end is equipped with a bevelled roller carrying control crank 98 disposed to engage with the outer edge 73 of a gage and blade carrier 71 in the manner shown in Figures 1, 2 and 7 and as previously described. A clamp 99 is secured on the rock shaft 96, and a torsion spring 100 coiled about said shaft and anchored at one end to the clamp and at its other end to the bearing 94 constantly tends to hold the crank 98, or rather the roller thereof against the cooperating gage and blade carrier. Another clamp 101 is secured on the rock shaft 96 and is engageable with the bracket 93 to limit inward movement of the crank so that it will retain its proper position when the respective cutter head portion 66 is swung away in the manner and for the purpose previously described.

A counter shaft 102 is rockably mounted in the inner bearings 94 and has a gear sector 103 secured thereon in position for meshing with a like gear sector 104 secured on the rock shaft 96. Since the cranks 81 and 98 are disposed at the same side of the machine, as will be apparent by reference to Figure 1, and therefore engage relatively at opposite sides of the respective cutter heads as diagrammatically illustrated in Figure 12, one to the right and upwardly of center, and the other to the left and upwardly of center looking in the direction of feeding of the corn ears through the cutter head, it is necessary to reverse the direction of rocking movement of the counter shaft 102 with relation to the actuator rock shaft 96 so that said counter shaft will move in the same manner as the cooperating rock shaft 79 at the opposite end of the machine.

Like the rock shaft 79, the counter shaft 102 has a crank 105 secured thereon, and said crank is equipped at its free end with a longitudinally projecting pin 106 on which the outer end of placer link 107 is pivoted. The inner end of the link 107 is equipped with a pivot pin connected as at 108 to an interponent block 109 which is slidable on the top surface of the particular underlying actuator arm 51 in the same manner as that previously described, and said block is also bevelled at its upper inner corner as illustrated in Figure 9.

From the foregoing it will be apparent that when power is applied to the driver shaft 31, rotation will be imparted to the crank 25, and the lower crosshead will be reciprocated along the guide rods 19, this movement being compounded through the gear and rack equipments 20, 21, 16, 15 so that like reciprocation is imparted at an accelerated rate and distance to the upper cross head 11. Under normal operation, upon each advance movement of the pusher plunger means 14 the plunger will engage a corn ear gripped and accurately placed between the receiving jaws 37 in the respective end of the machine and push said ear through the blades of the cutter head at the particular end of the machine for cutting the kernels therefrom. Assuming the direction of movement of the pusher to be to the left as viewed in Figures 1 and 2, as the respective actuator member 62 comes against the crank portion 60 in the manner illustrated in Figures 2 and 9, it will cause the rocker 56 to press downwardly on the interponent block 91 in the manner illustrated in Figure 2, depressing the actuator arm 51 and the underlying arm 43 to bring about an opening or separation of the receiving jaws 37 at the respective end of the machine as shown at the left in Figure 1.

It is to be understood that the corn ear advancing means or pusher 10 is continuously reciprocated to alternately feed corn ears to the cutter heads at the respective ends of machine, and upon the retraction of pusher plunger 14 from the right hand end of the machine as viewed in Figure 1, the other actuator 62 will engage the crank 60 and rock the cross head 56 in the opposite direction illustrated in Figure 9 to force the interponent block 109 downwardly and depress the underlying actuator arm 51 and the under lying actuator 43 to move the formerly closed jaws 37 from the closed position illustrated at the right hand end of Figure 1 to the open or corn ear receiving position shown in Figure 6.

Figure 3:
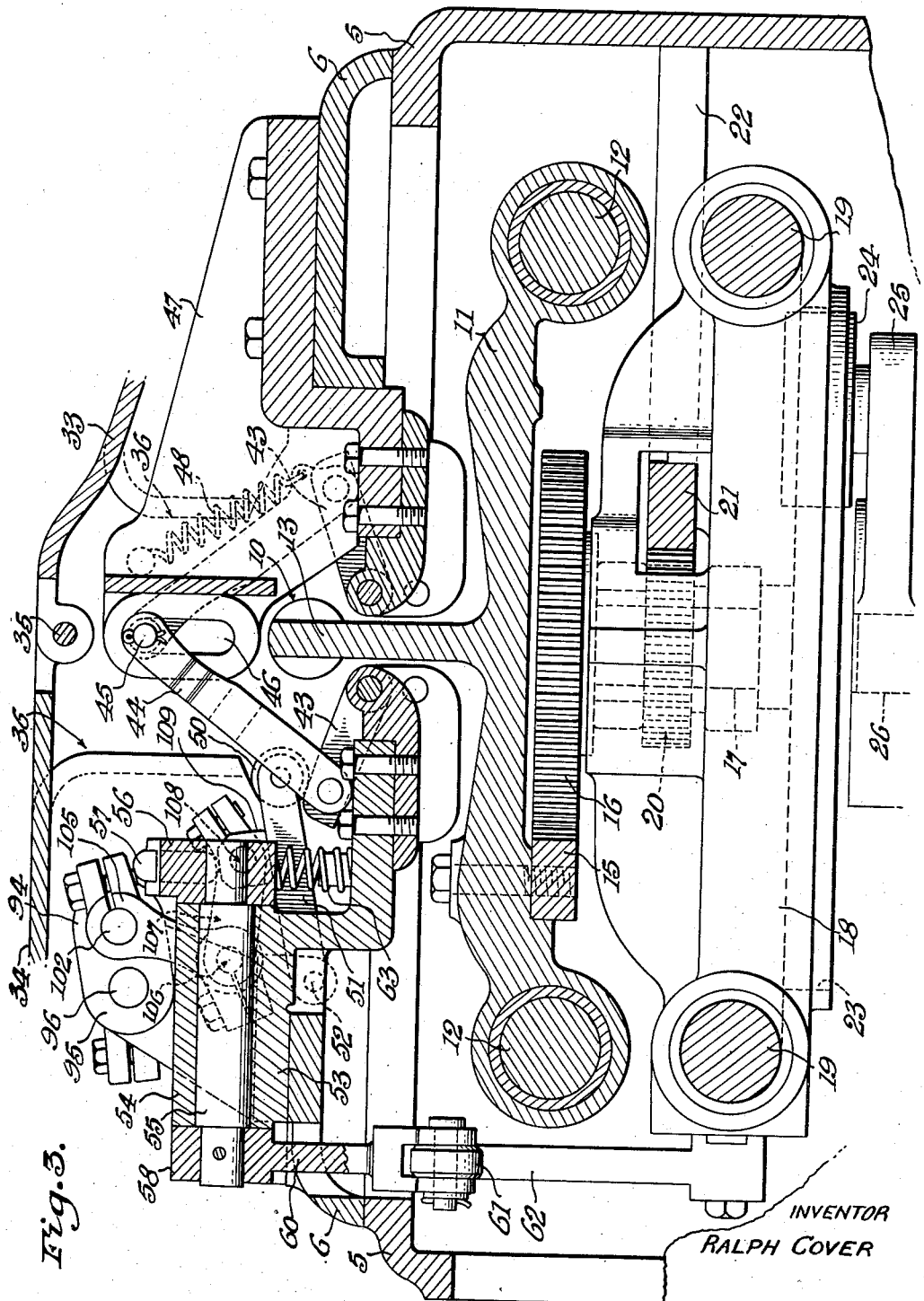
Figure 3 is an enlarged fragmentary vertical cross section taken on the line 3—3 on Figure 1, portions of the cover plates being shown in place, the parts being shown in the positions they assume when the associated corn ear receiving jaws are in a closed position, as when they are accurately feeding or placing an ear of corn for being pushed through a cutter head.
Figure 4:
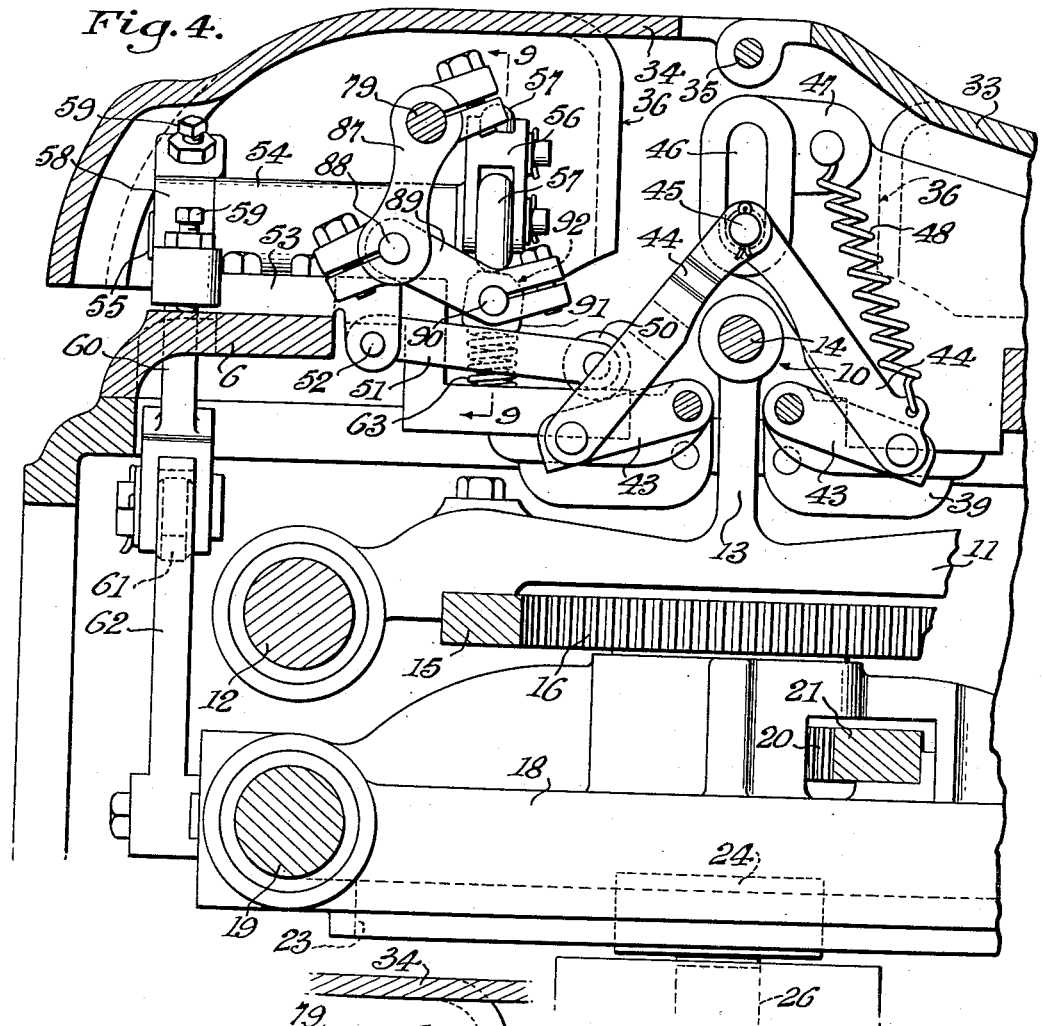
Figure 4 is a view similar to Figure 3, the section being taken on the line 4—4 on Figure 1 and illustrating the parts in the position they will assume when cooperating corn ear receiving and holding or feeding jaws are moved to their open, corn ear receiving position.
Figure 5:
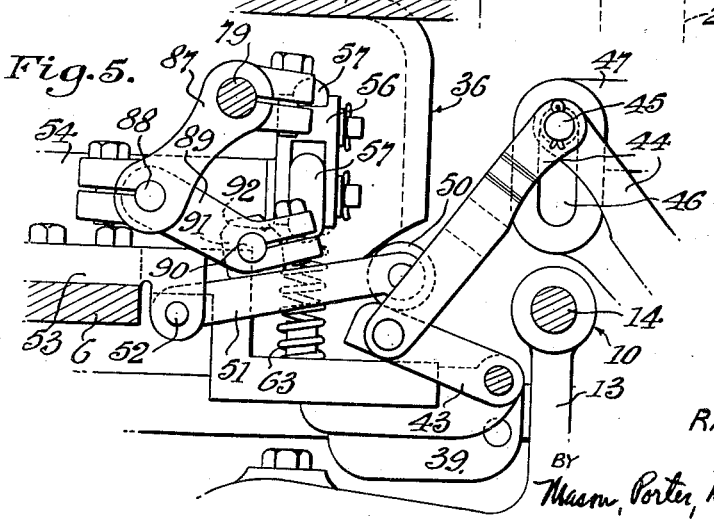
Figure 5 is an enlarged fragmentary vertical cross section illustrating the interponent in its retracted position in which the cross head is permitted to move idly without depressing the corn ear receiving jaw opening devices in the manner illustrated in Figure 4.

At any time a jam occurs in one of the cutter heads and the gage and blade carriers 71, 73 are held outwardly a predetermined distance from their fully retracted position, by clogging of a corn ear in the blades, or by mere failure of the carriers to return because of sluggish operation, the respective control crank 81 or 98 will be held outwardly in position for displacing the respective interponent block 91 or 109 from the operative position shown in Figures 3, 4 and 9 to an inoperative or retracted position such as is shown in Figure 5. It is to be understood that this ineffective position or retraction of an interponent block is brought about each time a corn ear is forced through the kernel cutting blades, but this is a mere idle or ineffective displacement except when a jam occurs in one of the heads and the normal replacement of the interponent block at its effective position has not been accomplished at the time the cooperating actuator roller 57 next descends in the manner illustrated in Figure 5. Whenever an interponent block is thus held in its displaced position, the respective actuator roller 57 descends idly and does not effect an opening of the associated receiving means or a separation of the closure wings 49 and corn ear receiving jaws 37 in the manner illustrated in Figure 6. From the foregoing, and by reference to Figures 3 to 7, it will be apparent that the displaceable interponent 91 and the members 51, 43, 42, 41 and 37 comprise a chain of cooperating parts through which movement of the actuator 56, 57 normally is transmitted to the closure wings 49. When the interponent is normally placed as in Figure 4 descent of the respective roller 57 as shown in said figure will bring about a separation of the wings 49 into slot opening, corn ear receiving position, as shown in Figure 6. Whenever the interponent is displaced as shown in Figure 5 as a result of a jam in a cutter head, thus breaking the continuity of the before mentioned chain of cooperating parts, the actuator 56, 57 will oscillate idly as aforesaid without contacting the interponent, and no movement will be imparted to the underlying member 51 or connected and cooperating parts.

It will be apparent that a corn ear receiving means or feed jaw set will remain in the closed position, and it will be impossible to feed corn ears into that particular receiving means until the jam or faulty condition in the particular cutter head has been relieved. However, normal operation of the other end portion of the machine will not be disrupted by a jam at one end because the construction and operation of the parts is such as to permit continuation of normal operation at said other end. It is not the first corn ear clogging which causes real trouble in corn cutting machines because a single ear jam can usually be corrected by mere jiggling of the ring handle 76. Double chokes are what cause the real difficulty and damage and corn losses in cutting machines, and such double chokes are practically impossible in the improved machine structure disclosed herein because the receiving devices are held closed and it is impossible to feed a second ear after a jam occurs. Thus in this improved machine, operators will not be tempted to over tension the blades and the machine can be maintained in sensitive adjustment so as to attain full quality cutting of the kernels from the corn ears. It will be apparent also that this elimination of double chokes will relieve the machine of the strains of such double chokes, repair bills will be reduced, and the capacity of the machine for correctly cutting kernels from the corn ears will be materially increased.

It will be observed that the control cranks 81 and 98 are clamped on the respective rock shafts 79 and 96. Thus the degree of opening of the carrier 71, 73 to be effective in the control can be adjusted by adjusting the cranks 98 and 81 on the respective rock shafts to vary the effective point of contact between the controlling carrier and the respective crank arm. Similarly, the interponent carrying or actuating cranks 87, 105 can be adjusted about the shafts 79 or 102 so as to vary the degree of projection of the respective interponent under the respective actuator roller 57, thus to vary the time interval necessary for effecting the removal of the interponent from beneath said roller. This adjustment is important and assures very accurate control. Should the blade carriers be held open only slightly, the respective roller 57 would be engageable with the bevel on the partially displaced interponent and a camming action would result which would serve to bring about the desired full displacement of the interponent block without opening the associated closure wings 49 or the corn ear receiving jaws 37. It should be noted, also, that each crank arm 81 or 98 is relatively short compared to the cooperating crank 87 or 105, and hence a short arc of movement of one of the cranks 81 or 98 will bring about a much greater arc of movement of the cooperating crank 87 or 105, and consequently a relatively long sliding movement of the connected interponent block.

While one form of the invention has been shown for purposes of illustration, it is to be clearly understood that various changes in the details of construction and arrangement of parts may be made without departing from the spirit and scope of the invention as defined in the appended claims.

I claim:

1. Mechanism for cutting corn from cobs comprising a peripherally operable cutter means, corn ear guide means operatively associated with said cutter means, means associated with said guide means for advancing corn ears toward said cutter means, feeding means operatively associated with said corn ear guide means, and means operatively associated with said cutter means and said feeding means to stop operation of said feeding means upon clogging of said cutter means.

2. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said feeding means including a pair of separable jaws between which corn ears are receivable and from which the corn ears are pushed by the pusher through the guide means and cutter means, means being included for projecting and retracting the pusher through the jaws, and said stopping means including devices for normally bringing about a closing of the jaws prior to each projection of the pusher therethrough and for opening said jaws following each retraction of the pusher and other devices actuated by the cutter means when in clogged position to render the jaw opening and closing function of said first mentioned devices ineffective.

3. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said cutter means including cutter blades engageable by corn ears and carriers for the blades displaceable outwardly upon passage of corn ears through the blades, means being included for projecting and retracting the pusher through the cutter means, and said stopping means including devices effectively actuated by contact of a blade carrier whenever the same is held in an outwardly displaced position as by a cutter means clogged condition when the pusher is retracted.

4. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said feeding means including a pair of separable jaws between which corn ears are receivable and from which the corn ears are pushed by the pusher through the guide means and cutter means, and said cutter means including cutter blades engageable by corn ears and carriers for the blades displaceable outwardly upon passage of corn ears through the blades, means being included for projecting and retracting the pusher through the jaws and cutter means, and said stopping means including devices effectively actuated by a blade carrier whenever the same is held in an outwardly displaced position as by a cutter means clogged condition when the pusher is retracted.

5. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said feeding means including a pair of separable jaws between which corn ears are receivable and from which the corn ears are pushed by the pusher through the guide means and cutter means, said cutter means including cutter blades engageable by corn ears and carriers for the blades displaceable outwardly upon passage of corn ears through the blades, means being included for projecting and retracting the pusher through the jaws and cutter means, a constantly operating actuator and a chain of cooperatively engaging movement-imparting devices operable in timed relation to the projection and retraction of the pusher to bring about an opening of said jaws each time the pusher is retracted and a closing of said jaws each time the pusher is projected, said chain of movement-imparting devices including a displaceable interponent, and said stopping means including devices effectively actuated by movement of a blade carrier for displacing the interponent to break the continuity of said chain and cause the actuator to move idly whenever the cutter blades are held outwardly of their fully retracted position as by a cutter means clogged condition when the pusher is retracted without transmission of movement of the jaws thereby to leave the jaws in a closed or corn ear rejecting position.

6. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said feeding means including a pair of separable jaws between which corn ears are receivable and from which the corn ears are pushed by the pusher through the guide means and cutter means, said cutter means including cutter blades engageable by corn ears and carriers for the blades displaceable outwardly upon passage of corn ears through the blades, means being included for projecting and retracting the pusher through the jaws and said cutter means, a constantly operating actuator and a chain of cooperatively engaging movement-imparting devices operable in timed relation to the projection and retraction of the pusher to bring about an opening of said jaws each time the pusher is retracted and a closing of said jaws each time the pusher is projected, said chain of movement-imparting devices including a displaceable interponent, and said stopping means including devices effectively actuated by movement of a blade carrier for displacing the interponent to break the continuity of said chain and cause the actuator to move idly whenever the cutter blades are held outwardly of their fully retracted position as by a cutter means clogged condition when the pusher is retracted without transmission of movement to the jaws thereby to leave the jaws in a closed or corn ear rejecting position and automatically operable to place said interponent in its movement-imparting device chain completing condition upon removal of the clogged condition of the cutter means and return of the blades to their normal inward position thereby to restore said actuator and movement-imparting device chain to normal jaw opening and closing cooperative relation.

7. Apparatus as defined in claim 6 in which the interponent placing and displacing means includes a rock shaft, a crank on the rock shaft engageable by a blade carrier, spring means constantly urging the crank toward the blade carrier, and an interponent carrier member movable with the rock shaft to effectively place the interponent or to displace the interponent from its effective position accordingly as the shaft is rocked in one direction or the other.

8. Apparatus as defined in claim 6 in which the interponent placing and displacing means includes a rock shaft, a crank on the rock shaft engageable by a blade carrier, spring means constantly urging the crank toward the blade carrier, and an interponent carrier member movable with the rock shaft to effectively place the interponent or to displace the interponent from its effective position accordingly as the shaft is rocked in one direction or the other, said interponent having a camming face on the surface thereof presented in position for being engaged by the actuator when the cutter blade carrier is held outwardly only a very limited distance from its fully retracted position and which is effective when engaged by the actuator to make the actuator capable of displacing the interponent against the action of the spring means.

9. Mechanism for cutting corn from cobs comprising a peripherally operable cutter means, corn ear guide means operatively associated with said cutter means, a pusher associated with said guide means for pushing corn ears toward said cutter means, feeding means operatively associated with said corn ear guide means, and means operatively associated with said cutter means and said feeding means to stop operation of said feeding means upon clogging of said cutter means, said feeding means including a pair of separable jaws between which corn ears are receivable and from which the corn ears are pushed by the pusher through the guide means and cutter means, and said cutter means including cutter blades engageable by corn ears and carriers for the blades displaceable outwardly upon passage of corn ears through the blades, means being included for projecting and retracting the pusher through the jaws and cutter means, and said stopping means including devices effectively actuated by a blade carrier whenever the same is held in an outwardly displaced position as by a cutter means clogged condition when the pusher is retracted, there also being included means providing an opening through which corn ears are passable to be received between the jaws when the jaws are open and the pusher is retracted, and means movable with the jaws to close said opening and prevent passage of corn ears therethrough each time the jaws are closed.

10. Apparatus as defined in claim 6 in which the interponent placing and displacing means includes a rock shaft, a crank on the rock shaft engageable by a blade carrier, spring means constantly urging the crank toward the blade carrier, and an interponent carrier member movable with the rock shaft to effectively place the interponent or to displace the interponent from its effective position accordingly as the shaft is rocked in one direction or the other, and wherein the cutter means is mounted in a cutter head and is swingably supported so that it can be swung into and out of its effective corn cutting position, said crank being projected into said head into position for being engageable by a blade carrier which is movable away from said crank whenever the cutter means is swung away and again back into position for being engageable with said crank whenever the cutter means is swung back to its effective position.

11. Mechanism for cutting corn from cobs comprising an elongated frame structure, a peripherally operable cutter means disposed at each end of said frame structure, a corn ear guide means operatively associated with each said cutter means, a reciprocable pusher associated with both said guide means for pushing corn ears through first one guide means and its associated cutter means and then the other guide means and its associated cutter means, feeding means operatively associated with each said corn ear guide means, and means associated with each said cutter means and its associated feeding means to stop operation of a particular feeding means upon clogging of its associated cutter means while maintaining normal operation of the other feeding means and its associated cutter means.

12. Mechanism as defined in claim 11 in which each said feeding means includes a pair of separable jaws between which corn ears are receivable and from which corn ears are pushed by the pusher through the particular associated guide means and cutter means, means being included for projecting and retracting the pusher through both jaw pairs and cutter means, and wherein each said stopping means includes devices for normally bringing about a closing of the jaws of the particular associated jaw pair prior to each projection of the pusher therethrough and for opening said jaws following each retraction of the pusher and other devices actuated by the particular associated cutter means when in clogged position to render the jaw opening and closing function of said first mentioned devices ineffective.

13. Mechanism as defined in claim 11 in which each said cutter means includes cutter blades engageable by corn ears and carriers for the blades displaceable outwardly upon passage of corn ears through the blades, means being included for projecting and retracting the pusher through each guide means and its associated cutter means, and each said stopping means includes devices effectively actuated by contact of a blade carrier of the particular associated cutter means whenever the same is held in an outwardly displaced position as by a cutter means clogged condition when the pusher is retracted from said particular associated cutter means.

14. Mechanism as defined in claim 11 in which each said feeding means includes a pair of separable jaws between which corn ears are receivable and from which corn ears are pushed by the pusher through the particular associated guide means and cutter means, in which each said cutter means includes cutter blades engageable by corn ears and carriers for the blades displaceable outwardly upon passage of corn ears through the blades, means being included for projecting and retracting the pusher through both jaw pairs and both cutter means, and each said stopping means includes devices effectively actuated by contact of a blade carrier of the particular associated cutter means whenever the same is held in an outwardly displaced position as by a cutter means clogged condition when the pusher is retracted from said particular associated cutter means.

15. Mechanism as defined in claim 11 in which each said feeding means includes a pair of separable jaws between which corn ears are receivable and from which the corn ears are pushed by the pusher through the guide means and cutter means, in which each said cutter means includes cutter blades engageable by corn ears and carriers for the blades displaceable outwardly upon passage of corn ears through the blades, there also being included means for reciprocating the pusher, a constantly operating actuator, a chain of cooperatively engaging movement-imparting devices operatively associated with each jaw pair and with the actuator and operable by said actuator in timed relation to the projection and retraction of the pusher to bring about a closing of the jaws of the particular associated pair each time the pusher is projected toward the particular associated cutter means and an opening of the jaws of said associated pair each time the pusher is retracted from said associated cutter means, each said chain of devices including a displaceable interponent, and each said stopping means including devices effectively actuated by movement of a blade carrier in the particular associated cutter means for displacing the particular associated interponent to break the continuity of the particular associated chain of devices and cause the actuator to move idly whenever the cutter blades in said particular associated cutter means are held outwardly of their fully retracted position as by a cutter means clogged condition when the pusher is retracted from said associated cutter means without transmission of movement to the particular associated jaw pair thereby to leave the jaws of said pair in a closed or corn ear rejecting position.

16. Mechanism as defined in claim 11 in which each said feeding means includes a pair of separable jaws between which corn ears are receivable and from which corn ears are pushed by the pusher through the particular associated guide means and cutter means, means being included for projecting and retracting the pusher through both jaw pairs and cutter means, and wherein each said stopping means includes devices for normally bringing about a closing of the jaws of the particular associated jaw pair prior to each projection of the pusher therethrough and for opening said jaws following each retraction of the pusher and other devices actuated by the particular associated cutter means when in clogged position to render the jaw opening and closing function of said first mentioned devices ineffective, there also being included a cover means extending over each jaw pair and having an opening therein over each jaw pair and through which corn ears may drop to be received between the jaws of a pair when said jaws are open and the pusher is retracted with relation to the particular jaw pair, the jaws of each pair having laterally extended wings disposed to form a closure over the associated overlying opening to prevent downward falling of a corn ear through said opening whenever the jaws of said particular pair are closed.

References Cited in the file of this patent

UNITED STATES PATENTS

| | | |
|---|---|---|
| 1,909,667 | Douthitt | May 16, 1933 |
| 2,001,457 | Douthitt | May 14, 1935 |
| 2,216,065 | Cover | Sept. 24, 1940 |
| 2,332,894 | Cover | Oct. 26, 1943 |
| 2,510,558 | Cover | June 6, 1950 |